United States Patent [19]

Shepard

[11] Patent Number: 5,277,810
[45] Date of Patent: Jan. 11, 1994

[54] JUICING CONTAINER FOR A PRESS

[76] Inventor: Joel R. Shepard, 1017 S. Georgia, Amarillo, Tex. 79102

[21] Appl. No.: 682,478

[22] Filed: Apr. 9, 1991

[51] Int. Cl.$^5$ ............................................. B01D 35/28
[52] U.S. Cl. .................................. 210/464; 210/476; 210/493.1; 210/497.01
[58] Field of Search .................... 210/350, 359, 416.1, 210/416.2, 416.3, 416.4, 416.5, 464, 469, 470, 474, 477, 478, 481, 493.1, 494.1, 476, 497.01; 426/80, 489; 220/666; 206/218

[56] References Cited

U.S. PATENT DOCUMENTS

| | | | |
|---|---|---|---|
| 34,241 | 1/1862 | Cadding | 100/116 |
| 3,557,788 | 1/1971 | Swartz | 220/666 |
| 3,995,544 | 12/1976 | Farley | 100/116 |
| 4,211,156 | 7/1980 | Zimmerman | 426/80 |
| 4,306,492 | 12/1981 | Zimmerman | 426/80 |
| 4,420,404 | 12/1983 | Coate et al. | 210/350 |

Primary Examiner—Robert A. Dawson
Assistant Examiner—W. L. Millard
Attorney, Agent, or Firm—Novak, Vickers & Burt

[57] ABSTRACT

Structure and method for extracting juice from fruit and vegetable matter. The container comprises a flexible pleated body that tends to an expanded configuration. Each end of the body has rigid caps screwably attached that are flat on their exterior ends for receiving an axial force imparted by a press. The straining cap is perforated thereby allowing the extracted juice to pass from the container. A means for filtering the juice is placed upon the straining cap. A plug is attached as an integral part of either cap. Said plug evacuates the volume of the collapsed container in the final stages of extraction.

22 Claims, 2 Drawing Sheets

ALTERNATIVE EMBODIMENT

JUICING CONTAINER FOR A PRESS

BACKGROUND OF THE INVENTION (1) Field of the Invention

This invention relates generally to juice extraction machines. More specifically, this invention relates to juicing presses intended for home use to extract juice from fruit and vegetable matter. Those with ordinary skill in the art would be users of fruit and vegetable juicers.

(2) Description of the Related Art

A home juicer commonly referred to and known as the NORWALK JUICER is commercially available and used to press the juices from pulverized fruit and vegetable matter or pulp for human consumption. The juicer includes a press capable of applying a compression force upon a pouch within which the juice laden pulp matter is held. The bottom of the press comprises a drainage tray in which the juice is received upon said juice's extrusion from the pouch. The juice within the tray is directed toward a spout in the tray located at the front of the juicer and from which the juice is ultimately collected.

The pouch, as originally designed, is a bag or folded over sheet. The pouch is to be constructed from fabric or mesh material. The extraction process begins with a pulverization of the fruit or vegetable matter so that the juices contained therein are more easily extracted. A means for pulverizing the matter is attached to the juicer's housing; the same housing within which the press operates. After pulverization, the pulp is placed in the bag or sheet and compressed within the press so that the juice of the pulp is extruded through the weave of the fabric. Substantially all of the solids are retained inside the pouch.

There are two primary drawbacks to the use of a fabric pouch. The first disadvantage is that the pressures exerted by the pulp on the mesh bag during compression are not evenly distributed because of the non-uniform shape of the fabric pouch. As a result, high pressures often occur at specific points of the fabric causing ruptures that allow the pulp and juice to escape through the resulting tear. When a rupture does occur, the pulp is often sprayed about the kitchen or upon the operator of the press.

The second disadvantage of a cloth pouch is that said pouch is very difficult to clean once the pulp material has been pressed into the weave of the fabric. The indicated method for cleaning the fabric pouch is normal laundering which is often ineffective. The inability to easily clean the fabric pouch is particularly undesirable because the juice is intended for human consumption and sanitation is of utmost importance. If not properly sanitized after each use, contamination may occur in future uses of the pouch.

While there are no known devices that would render the present invention obvious, the following patented devices have similar aspects to the present invention. U.S. Pat. No. 3,831,516 to Johnson discloses a continuous press that is used to extract juice from the wet pulp of grapes. The continuous press comprises helicoidal ripples which press the pulp against a more rigid screen and with a rippling action moves the pulp through and out of said press.

U.S. Pat. No. 4,775,564 to Shriver discloses a collapsible-stable blown container. The shown container comprises a series of flutes that collapse when subjected to an external axial force. It is intended that the Shriver container will remain in the collapsed configuration until disturbed by another force that expands the container.

U.S. Pat. No. 4,492,313 to Touzani for a collapsible bottle discloses a foldable plastic bottle with bellows type sides. The Touzani bottle is also designed to remain in a collapsed position with the bellows folded until an expanding force is applied to the bottle.

Of the above patents, only Johnson discloses a device whose purpose is to extract juice from a fruit or vegetable pulp. Johnson, however, appears to be more appropriate for commercial use and not inside the home. Additionally, Johnson does not include a container which is completely separable from the pressing mechanism.

SUMMARY OF THE INVENTION (1) Progressive Contribution to the Art

The present invention offers many advantages over the cloth pouch currently used in the NORWALK JUICER. This invention comprises components constructed from polymers that are all food safe and approved for use in food handling. The body of the juicer is constructed from a flexible plastic having a tensile strength sufficient to control pressures generated within the container and prevent ruptures.

When the caps are installed upon the body of the container, liquid-tight seals are formed between said caps and the body. In this way the container is made liquid impermeable except for perforations in the straining cap. The benefit of this configuration is that the juice is directed to a specific outlet area of the container and is not allowed to bleed from all exterior sides of said container. Furthermore, the rounded construction of the body more equally distributes the pressure generated during compression than the pouch.

The caps which are attached to the ends of the container are specially adapted so that their flat ends receive the axial force exerted by the press and collapse the body of the container along the major axis or center line of said container. A primary benefit of having these flat-ended caps is that the direction of the compression forces are controlled as well as the collapsing of said container.

The plug, being an integral part of either of the caps, or a separate insertable component, is forced into the void of the collapsed container in the last stages of the extraction process. The plug affects a final pressing of the pulp thereby extracting the last remnants of juice from the heavily juice laden pulp at the end of the squeezing process. The reason the plug increases the yield of rendered juices appreciably is that the juice content is very high in the condensed pulp held in the container in the final stages of compression.

Still a further benefit of the present invention is that the contemplated straining configurations make it possible for the juice to be directed through filters of varying mesh sizes. This is accomplished by having interchangeable filters as well as combinations of several filters. Furthermore, the straining and filtering configuration is easily cleaned and sanitized.

The quality of being easy to clean extends throughout the entire structure of the container. By disassembling the container, all parts of the container are exposed so that they can be easily reached with water jets or manually operated cleaning instruments. Because the invention is constructed from durable plastic parts, the container is dishwasher safe.

This device is easy to fill with the pulverized vegetable and fruit matter because the natural tendency of the container is to an expanded configuration in which a void or volume is defined within the container. Because of this inherent tendency towards an expanded configuration, the operator does not have to hold the container open and ready to receive the pulverized material. Instead, the container may be placed beneath the outlet of the pulverizing mechanism thereby freeing both hands of the operator for the pulverizing process.

(2) Objects of this Invention

An object of this invention is to provide a container that thoroughly extracts the juice from fruit and vegetable matter.

Another object of this invention is to provide a container to be used in a juicing press that resists ruptures.

Still another object of this invention is to provide a juicing container that is easily cleaned and sanitized.

Further objects are to achieve the above with devices that are sturdy, compact, durable, lightweight, simple, safe, ecologically compatible, and reliable, yet inexpensive and easy to manufacture, operate, and maintain.

Other objects are to achieve the above with a method that is rapid, versatile, efficient, inexpensive, and does not require highly skilled people for implementation.

The specific nature of the invention, as well as other objects, uses, and advantages thereof, will clearly appear from the following description and from the accompanying drawings of which the different views are not necessarily scale drawings.

Figure 1:
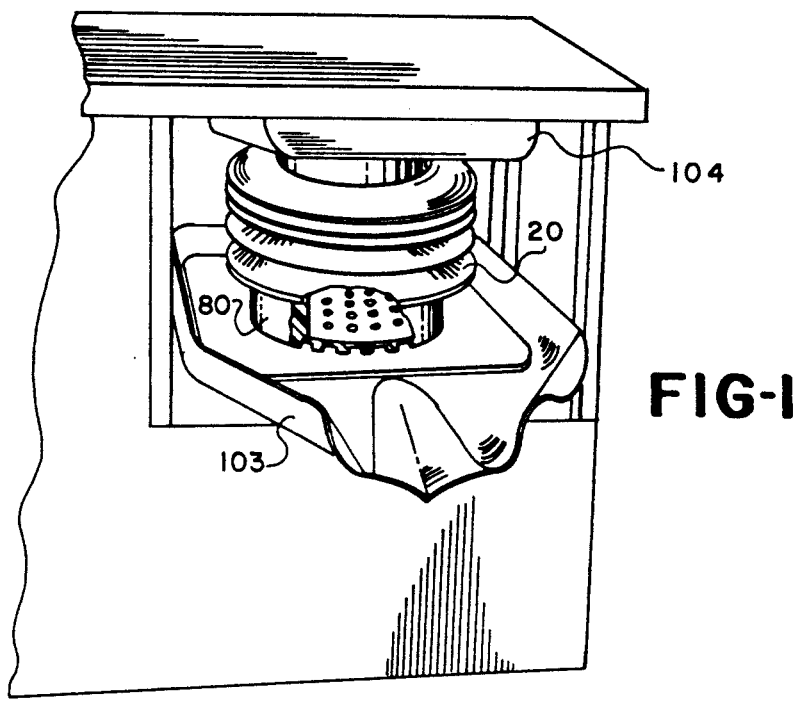
FIG. 1 is a perspective view of the assembled container positioned in the press and showing perforations in the straining cap through a cut-away in the body of the container.

As an aid to correlating the terms of the claims to the exemplary drawings, the following catalog of elements and steps is provided:

10 container
12 major axis
14 working clearance
16 aperture
18 neck
20 collapsible body
22 body side
30 pressing end
32 spiral ridge
34 spiral groove
40 straining end
50 plug
52 alternative plug
54 flat plug surface
60 large volume
62 small volume
64 large cylinder
66 small cylinder
70 pleat
72 pleat side
74 pleat apex
80 straining cap
82 perforation
84 drainage channel
86 level bottom end
87 exit port
88 flat upper surface
89 channelled lower surface
90 pressing cap
92 flat top end
94 circular crevice
100 expanded configuration
102 collapsed configuration
103 drainage tray
104 pressing plate
110 filtration disk

DESCRIPTION OF THE PREFERRED EMBODIMENTS

In compliance with the constitutional purpose of the Patent Laws "to promote the progress of science and useful arts" (Article 1, Section 8), Applicant submits the following disclosure of the invention.

Referring to FIG. 1 of the accompanying drawings, a container 10 may be seen. The container 10 is centered about a major axis 12 that serves as a longitudinal centerline of said container 10. The container 10 comprises a collapsible body 20. The container 10 has two ends, a pressing end 30 and a straining end 40. The body 20 also has two ends similarly identified.

The container 10 is intended to be used in a juicing press or juicer capable of exerting a maximum load of 600 pounds per square inch (600 p.s.i.). The press includes a pressing plate 104 above a drainage tray 103. Both the pressing plate 104 and the drainage tray 103 have flat surfaces creating parallel planes, one above the other. When operated, the pressing plate 104 ascends vertically upward toward the drainage tray 103.

Each of the two ends 30 and 40 comprise a neck 18. Each neck 18 is threaded by a spiral ridge 32 about said neck's circular exterior surface. In the preferred embodiment, each end 30 and 40 of the body 20 is open through apertures 16. It is contemplated, however, that the pressing end 30 may be closed and without an aperture 16 so that the body 20 is only open at one end, the straining end 40.

The body 20 has a body side 22 extending between the two ends 3 and 40. It should be understood that the body 20 may have any cross-sectional shape on planes perpendicular to the major axis 12. In order to most evenly distribute the pressure created inside the container 10, however, the cross-sectional shape of the body 20 should be circular at all planes located along a length of said body 20 and perpendicular to the major axis 12. The length of said body 20 is measured along the major axis 12 between the pressing end 30 and the straining end 40.

In the preferred embodiment shown, the body 20 has a pleated side 22 where said sides 22 comprise a series of pleats 70. Each pleat 70 forms an annular ring about the major axis 12 of the container 10. At all points along the length o the body 20 the pleated sides 22 define circular cross-sections on planes perpendicular to the major axis 12. The diameters of the circular cross-sections differ, however, depending upon the location of the plane with respect to an individual pleat 70 within which said plane lies.

Figure 2:
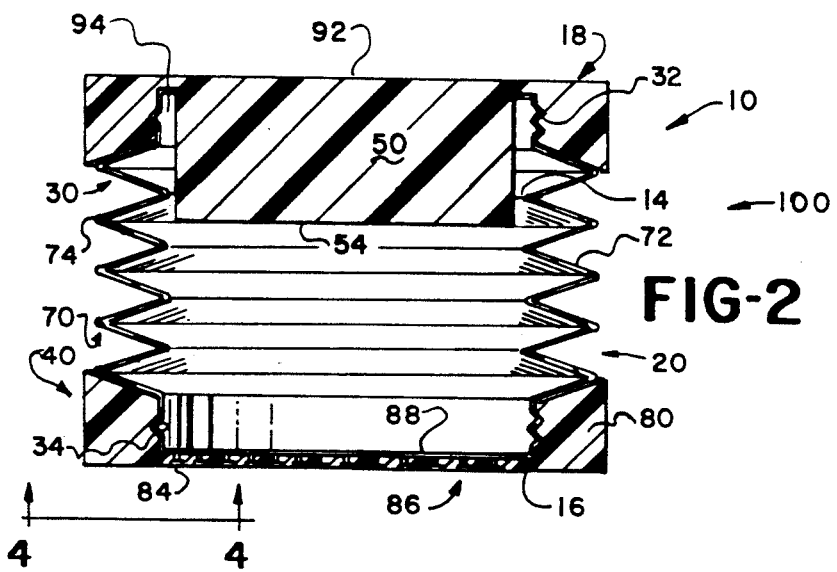
FIG. 2 is an elevational section of the assembled container in the expanded configuration.
Figure 3:
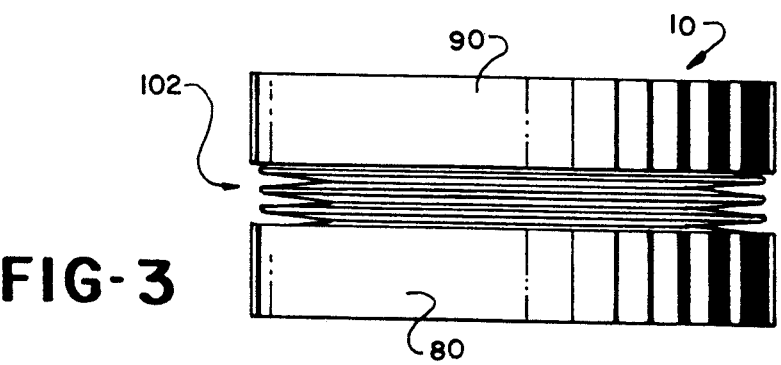
FIG. 3 is an elevational view of the assembled container in the collapsed configuration.

Considering a section of the body defined by a plane extending radially from the major axis 12, and most easily viewed in FIG. 3, each pleat 70 has the shape of an isosceles triangle. That is, each pleat 70 has two pleat sides 72 where said sides 72 are of equal length. The intersection of the sides 72 defines a pleat apex 74. A base line of the pleat 70 is defined by a line intersecting each of the two pleat sides 72 at base ends of said pleat sides 72 opposite the pleat apex 74. As shown in FIG. 2, the series of pleats 70 comprising the side 22 is created by connecting consecutive pleats 70 at adjacent base ends of said pleats 70.

Each pleat 70 is oriented so that said pleat's 70 apex 74 is distally located from the major axis 12 and each pleat's 70 base line is parallel to and nearer the major axis 12. The exception to this configuration being where a top and bottom pleat join the necks 18 of body 20. Each side 72 joining a neck 18 is shorter than the other side 72 of that pleat 70.

The container 10 has an expanded configuration 100 as shown in FIG. 2 where the pleats 70 are oriented as described above. FIG. 3 shows the container 10 in a collapsed configuration 102 with the pleats 70 folded so that the pleat sides 72 are closer together at the base ends and said sides 72 approach parallel or are more nearly parallel than in the expanded configuration 100. The length of the container 10 measured along the major axis 12 is greater in the expanded configuration 100 than in the collapsed configuration 102.

A large volume 60 is defined within an interior of the container's 10 expanded configuration 100. A small is defined within the interior of the container's 10 collapsed configuration 102. Each volume 60 and 62 has a longitudinal centerline coincident with the major axis 12.

In the expanded configuration 100 shown in FIG. 2 the container 10 encloses a large cylinder 64. The large cylinder 64 has a length measured along a longitudinal center line of said cylinder 64 coincident with the major axis 12 and equal to an interior length of the container 10 measured between a pressing cap 90 and a straining cap 80. The cylinder 64 has a radius measured along a line oriented perpendicularly from the major axis 12 and extending toward the body side 22. The length of the radius is slightly less than the perpendicular distance between the major axis 12 and the base line of a pleat 70. That is, the radius of the cylinder 64 is just less than a smallest interior radius of the body 20 measured perpendicularly to the major axis 12. The difference between the length of the radius and that perpendicular distance between the major axis 12 and the base line equals the distance of a minimum working clearance 14.

In the collapsed configuration 102 shown in FIG. 3, the container 10 defines a small cylinder 66. The small cylinder 66 has a length measured similarly to the length of the large cylinder 64 which is less than said length of the large cylinder 64. The cylinder 66 has a radius equal to the radius of the large cylinder 64.

The body is constructed from flexible plastic that is approved as food safe and is liquid impermeable. The mode of construction for the body 20 is blow molding. Examples of construction materials would be polypropylene and polyethylene. The criteria for the construction material is that it be flexible enough to withstand repeated foldings of the pleats 70 and have a tensile strength sufficient to contain the pressures generated within the container 10.

To satisfy these criteria, it is preferred that the thickness of the body 20 be at least 0.02 inches. Furthermore, the pleat apexes 74 are rounded to radii of about one sixteenth to one eighth of an inch. The rounding of the apexes 74 prevents pressure concentrations and promotes even distribution of the pressure exerted outwardly upon the interior of the container 10.

The pressing cap 90 is screwably connectable to the pressing end 30 of the body 20 and the straining cap 80 is screwably connectable to the staining end 40 of the body 20. Each cap 80 and 90 has a spiral groove 34 that mates with the spiral ridge 32 thereby screwably attaching said caps 80 and 90 to the body 20.

The straining cap 80 and pressing cap 90 are injection molded from a plastic more rigid than that used in the construction of the body 20. The caps 80 and 90 must maintain their form under a deforming force of the press. The pressing cap 90 has a flat top end 92 and the straining cap 80 has a level bottom end 86. When installed into the press, the level bottom end 86 of the straining cap 80 rests upon the flat portion of the drainage tray 103. The flat top end 92 of the pressing cap 90 is parallel to the flat surface of the pressing plate 104.

In the preferred embodiment, a plug 50 is an integral part of the pressing cap 90. The plug 50 is cylindrically shaped with dimensions similar to those of the small cylinder 66 within the collapsed container 10. The plug 50 is molded together with the pressing cap 90 in one piece. When the container 10 is in the collapsed configuration 102, a flat plug surface 54 of the plug 50 is proximate with a flat upper surface 88 of the straining cap 80. A perpendicular distance between rounded exterior sides of the plug 50 and the folded pleats 70 of the body side 22 is equal to the minimum working clearance 14.

The pressing cap 90 has a circular crevice 94 adapted with the spiral groove 34 on an interior circular surface off said crevice 94. The neck 18 extends into the crevice 94 when the spiral ridge 32 on said neck 18 is screwably mated with the groove 34 thereby creating a liquid tight seal between the body 20 and the pressing cap 90.

Figure 4:
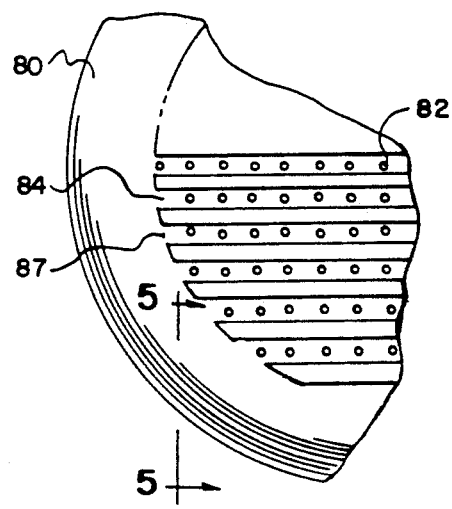
FIG. 4 is a partial section showing a bottom plan view of the straining cap.
Figure 5:
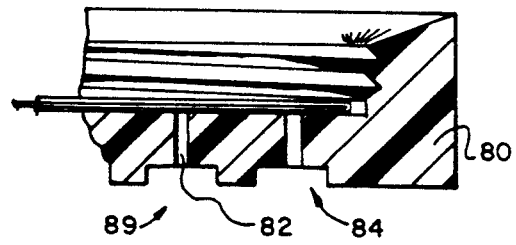
FIG. 5 is a section as indicated in FIG. 5 showing drainage channels and perforations in the straining cap together with the means for filtering the juice.
Figure 6:
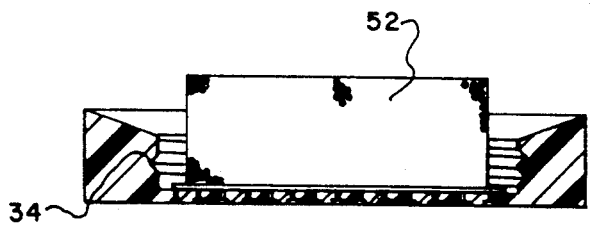
FIG. 6 is a perspective view of an alternative embodiment of the straining with the plug being a mesh covered structure located at the straining cap.

Details of the straining cap 80 are shown in FIGS. 4 and 6. Like the crevice 94 of the pressing cap 90, an interior circular surface of the straining cap 80 is adapted with a spiral groove 34 that is matable with the ridge 32 of the neck 18 at the straining end 40 of the body 20. When mated, the neck 18 creates a liquid tight seal between the body 20 and the straining cap 80.

An area of the cap 80 covering the aperture 16 of the straining end 40 of the body 20 has a plurality of passages through said cap's 80 thickness in the form of perforations 82. A longitudinal center line of each perforation 82 is parallel to the major axis 12. The perforations 82 extend from the flat upper surface 88 of the straining cap 80 to a channelled lower surface 89 of said straining cap 80.

The perforations 82 are arranged in a grid type manner as illustrated in FIG. 4. Drainage channels 84 are recessions into the channeled lower surface 89. The channels 84 are linear and parallel and arranged so that every perforation 82 extends from the flat upper surface 88 through the straining cap 80 and into a channel 84. Each channel 84 has a depth sufficient to allow juice to flow along said channel 84 to exit ports 87 at exterior edges of the cap 80.

A means for filtering juice passing from within the container 10 to said container's 10 exterior comprises filtration disks 110 and combinations thereof. The disks 110 are constructed from a mesh material. By using disks of different mesh sizes, the purity of the juice is governed. Possible materials used in the construction of the disks would be stainless steel or a plastic such as nylon. The filtration disks 110 are positioned above the perforations 82 at the flat upper surface 88 of the straining cap 80. A disk 110 is shown in FIG. 8.

If fewer solids are desired in the produced juice, then disks 110 having smaller meshes are used. An ultimate filtration is contemplated where a paper filter similar to a coffee filtration disks is sandwiched between two mesh filters 110. The mesh disks 110 resist the pressure being exerted on the filters thereby preventing the paper filter from being destroyed between the plug 50 and the upper surface 88 of the cap 80. This filtration configuration will produce a nearly clear liquid.

Figure 7:
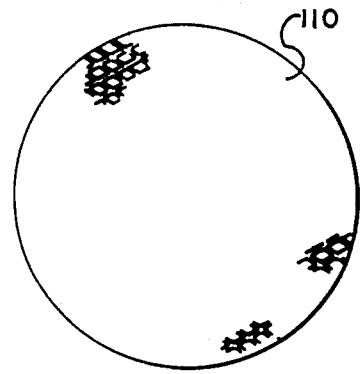
FIG. 7 is a top plan view of a mesh filtration disk.

An alternative embodiment contemplates an alternative plug 52 either being an integral part of the straining cap 80 or being positioned at said straining cap 80. Orientation of the plug 52 at the straining end 40 of the body 20 is illustrated in FIG. 7. The plug 52 has the same basic shape as the plug 50 described in the preferred embodiment. That is, the plug 52 is generally cylindrical shaped. In the embodiment in which the plug 52 is positioned at the straining cap 80, there is a flange extending radially about one end of said plug 52.

Instead of being a liquid impermeable solid, however, the plug 52 has a rigid under-structure through which there are many passages or perforations. Possible construction materials for the under-structure are rigid plastics and metals. An inner core or support tube is constructed from solid sheet metal or a similar material and serves as a brace giving additional support to the plug 52 during the extraction process. The cylindrical portion of the plug 52 is oriented concentrically about the support tube so that a longitudinal centerline of the tube is coincident with a longitudinal centerline of the plug 52.

The plug 52 has a covering of filtration mesh placed about the under-structure so that juice passing from the interior of the container 10 to the exterior is filtered by said mesh. It is contemplated that an example of the mesh would be 340/560 wire mesh.

In the alternative embodiment where the plug 52 is separate and apart from the straining cap 80 but at said cap 80, said plug 52 is held in place by the flange between the neck 18 at the straining end 40 of the body 20 and the installed straining cap 80. The form of the cap 80 in this embodiment is a perforated lid.

It is further contemplated that another plug may be included as an integral part of the body 20 at the end of said body opposite the straining end 40. The plug may be plug cast, molded, or glued into position, among other methods for fixing said plug to the body 20. In this embodiment, the plug is similar in shape and size to the plug 50, but this plug is an integral part of the body 20. In this embodiment, only one cap would be needed since the plug closes one end of the body 20.

OPERATION OF THE INVENTION

The straining cap 80, with the filtration disks 110 in place at said cap's 80 upper surface 88, is screwably attached to the straining end 40 of the body 20. The container 10 is then filled with pulverized pulp and the pressing cap 90 is screwably attached to the pressing end of the body 20. The container is now liquid impermeable except through the perforations 82. The container 10 is then placed within the press so that the straining cap 80 is downward and resting upon the drainage tray 103 and the pressing cap 90 is upward ready to abut the pressing plate 104 at said cap's 90 flat top end 92. It is preferred that the straining cap 80 be oriented so that the drainage channels 84 direct extracted juice toward the spout of the tray 103 from which the juice is collected by an operator.

The press is then activated thereby raising the tray 103, together with the container 10 and beginning the extraction process. As the container 10 is raised, the flat top end 92 of the pressing cap 90 contacts the pressing plate 104 where the upward motion of said cap 90 is stopped. The tray's 103 ascent continues thereby exerting an axial force upon the container 10 parallel to said container's longitudinal center line. The force collapses the container 10 by folding the pleats and reducing the length of said container 10. As the container 10 is reduced from its expanded configuration 100 to its collapsed configuration 102 juice is pressed and extracted from the pulp between the plug 50 and straining end 40. Because the straining end 40 of the container 10 is a low point, the extracted juice drains by gravity force to said straining end 40 and out of said container 10 through the perforations 82.

In the final stages of the extraction process, the plug 50 occupies a majority of the small cylinder 66 of the collapsed container 10. In this manner, the last remnants of juice are extracted from the pulp by the plug's pressing of the pulp against the filtration disks.

During the extraction process, the extracted juice flows down through the perforations 82 into the channels 84 and out of the channels 84 through the exit ports 87 into the drainage tray where said juice is collected and directed toward the spout of the tray.

After the extraction process is completed, either or both of the caps 80 and 90 are detached and the spent pulp matter removed. The container 10 is then completely disassembled for cleaning. All parts are dishwasher safe and may be loaded directly into a dishwasher. When disassembled, all surfaces are exposed and accessible by either water jets of a dishwasher or a manual cleaning instrument. The filtration disks 110 may require a certain degree of manual cleaning if pulp has been pressed into the mesh of the said disks 110. Paper filters are discarded.

In compliance with the statute, the invention has been described in language more or less specific as to structural features. It is to be understood, however, that the embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims, appropriately interpreted in accordance with the doctrine of equivalents.

I claim:

1. A container to be used in a juicer comprising:
   a. a pressing end located at
   b. one end of a collapsible body, c. a straining end located at an end of the body opposite the pressing end,
d. a plug extending into the body,
e. a major axis being a longitudinal centerline of the container,
f. the body having a pleated body side,
g. the body side defining circular cross-sectional areas on planes perpendicularly oriented to the major axis,
h. said pleated sides comprising a series of pleats,
j. the container having an expanded configuration and a collapsed configuration,
k. a large cylinder enclosed within the container when in the expanded configuration,
l. a small cylinder enclosed within the container when in the collapsed configuration,
m. each cylinder having a length measured along the major axis between the pressing end and the straining end,
n. each cylinder having a radius just less than a smallest interior radius of the body measured perpendicularly to the major axis,
o. each cylinder having a longitudinal centerline coincident with the major axis,
p. the container tending to the expanded configuration until an outside deforming force is exerted upon said container sufficient to overcome the tendency,
q. the plug having a length and shape similar to the small cylinder,
r. the plug extending into the small cylinder so that substantially all of said small cylinder is occupied by said plug,
s. a minimum working clearance being between the plug and the body,
t. the straining end being liquid permeable,
u. the straining end being the only part of the container through which liquid may escape from within the container;
v. the body being open through an aperture at the pressing end of said body, and
w. the body being open through another aperture at the straining end of the body.

2. The invention as defined in claim 1 further comprising:
v. the body being constructed from flexible material that is liquid impermeable,
w. the body being open through an aperture at the pressing end of said body,
x. the body being open through another aperture at the straining end of the body,
y. the series of pleats comprising a plurality of individual pleats joined at base ends of said pleats,
z. the series extending between the pressing end and the straining end,
aa. each pleat having a shape substantially like an isosceles triangle in a section defined by an intersection of a plane projecting radially from the major axis and said pleat,
bb. each pleat being oriented so that a pleat apex is most distally located away from the major axis and a base line of the pleat is nearer and parallel to said major axis,
cc. each pleat forming an annular ring about the major axis,
dd. the pleats being folded upon themselves in the collapsed configuration so that each of two pleat sides of each pleat are closer together and more nearly parallel than in the expanded configuration,
ee. the body terminating in threaded necks, one each at the pressing end and the straining end,
ff. each neck being threaded by a spiral ridge about an exterior surface of said neck,
gg. the container having a pressing cap connectable to the pressing end of the body,
hh. the container having a straining cap connectable to the straining end of the body,
jj. the straining cap having perforations that serve as passages through said cap,
kk. the straining cap having channels in a channeled lower surface of said straining cap,
ll. each channel extending from an interior of the channeled lower surface and having a depth sufficient to allow fluid to flow in said channel,
mm. each channel being open at an exterior edge of the straining cap,
nn. the pressing cap and the straining cap being constructed from a material sufficiently rigid to maintain the shape of said caps when the deforming force is applied,
oo. the pressing cap having a flat top end,
pp. the straining cap having a level bottom end
qq. the pressing cap and the straining cap being threaded with spiral grooves on a circular interior surface of said caps,
rr. the grooves on the caps and the ridges on the necks being matable,
ss. seals being created between the body and the caps thereby closing the necks of said body,
tt. the plug being constructed from a material sufficiently rigid to maintain said plug's shape under the deforming force,
uu. means for filtering being located at the straining end of the body,
vv. the plug being located at the pressing end of the container,
ww. a lower flat plug surface being positioned proximately with a flat upper surface of the straining cap when the container is in the collapsed configuration, and
xx. the means for filtering further comprises a mesh filtration disk positioned upon a flat upper surface of a straining cap.

3. The invention as defined in claim 1 further comprising:
v. the body being constructed from flexible material that is liquid impermeable,
w. the body being open through an aperture at the pressing end of said body,
x. the body being open through another aperture at the straining end of the body,
y. the series of pleats comprising a plurality of individual pleats joined at base ends of said pleats,
z. the series extending between the pressing end and the straining end,
aa. each pleat having a shape substantially like an isosceles triangle in a section defined by an intersection of a plane projecting radially from the major axis and said pleat,
bb. each pleat being oriented so that a pleat apex is most distally located away from the major axis and a base line of the pleat is nearer and parallel to said major axis,
cc. each pleat forming an annular ring about the major axis, dd. the pleats being folded upon themselves in the collapsed configuration so that each of two pleat sides of each pleat are closer together and more nearly parallel than in the expanded configuration,
ee. the body terminating in threaded necks, one each at the pressing end and the straining end,
ff. each neck being threaded by a spiral ridge about an exterior surface of said neck,
gg. the container having a pressing cap connectable to the pressing end of the body,
hh. the container having a straining cap connectable to the straining end of the body,
jj. the straining cap having perforations that serve as passages through said cap,
kk. the straining cap having channels in a channeled lower surface of said straining cap,
ll. each channel extending from an interior of the channeled lower surface and having a depth sufficient to allow fluid to flow in said channel,
mm. each channel being open at an exterior edge of the straining cap,
nn. the pressing cap and the straining cap being constructed from a material sufficiently rigid to maintain the shape of said caps when the deforming force is applied,
oo. the pressing cap having a flat top end,
pp. the straining cap having a level bottom end
qq. the pressing cap and the straining cap being threaded with spiral grooves on a circular interior surface of said caps,
rr. the grooves on the caps and the ridges on the necks being matable,
ss. seals being created between the body and the caps thereby closing the necks of said body,
tt. the plug being constructed from a material sufficiently rigid to maintain said plug's shape under the deforming force,
uu. means for filtering being located at the straining end of the body, and
vv. the plug being located at the pressing end of the container.

4. The invention as defined in claim 1 further comprising:
v. the series of pleats comprising a plurality of individual pleats joined at base ends of said pleats,
w. the series extending between the pressing end and the straining end,
x. each pleat having a shape substantially like an isosceles triangle in a section defined by an intersection of a plane projecting radially from the major axis and said pleat,
y. each pleat being oriented so that a pleat apex is most distally located away from the major axis and a base line of the pleat is nearer and parallel to said major axis, and
z. each pleat forming an annular ring about the major axis.

5. The invention as defined in claim 4 further comprising:
aa. the pleats being folded upon themselves in the collapsed configuration so that each of two pleat sides of each pleat are closer together and more nearly parallel than in the expanded configuration.

6. The invention as defined in claim 1 further comprising:
v. the body terminating in threaded necks, one each at the pressing end and the straining end,
w. each neck being threaded by a spiral ridge about an exterior surface of said neck.

7. The invention as defined in claim 6 further comprising:
x. the container having a pressing cap connectable to the pressing end of the body, and
y. the container having a straining cap connectable to the straining end of the body.

8. The invention as defined in claim 7 further comprising:
z. the straining cap having perforations that serve as passages through said cap.

9. The invention as defined in claim 8 further comprising:
aa. the straining cap having channels in a channeled lower surface of said straining cap,
bb. each channel extending from an interior of the channeled lower surface and having a depth sufficient to allow fluid to flow in said channel, and
cc. each channel being open at an exterior edge of the straining cap.

10. The invention as defined in claim 9 further comprising:
dd. the pressing cap and the straining from a material sufficiently rigid to maintain the shape of said caps when the deforming force is applied.

11. The invention as defined in claim 10 further comprising:
ee. the pressing cap having a flat top end, and
ff. the straining cap having a level bottom end.

12. The invention as defined in claim 11 further comprising:
gg. the pressing cap and the straining cap being threaded with spiral grooves on a circular interior surface of said caps,
hh. the grooves on the caps and the ridges on the necks being matable.

13. The invention as defined in claim 12 further comprising:
jj. seals being created between the body and the caps thereby closing the necks of said body.

14. The invention as defined in claim 1 further comprising:
v. the plug being constructed from a material sufficiently rigid to maintain said plug's shape under the deforming force.

15. The invention as defined in claim 14 further comprising:
w. the plug being an integral part of the straining cap.

16. The invention as defined in claim 14 further comprising:
v. the plug being an integral part of the pressing cap.

17. The invention as defined in claim 16 further comprising:
yy. a lower flat plug surface being positioned proximately with a flat upper surface of the straining cap when the container is in the collapsed configuration.

18. The invention as defined in claim 1 further comprising:
v. means for filtering being located at the straining end of the body.

19. The invention as defined in claim 18 wherein the means for filtering further comprises:
w. a mesh filtration disk positioned upon a flat upper surface of the straining cap.

20. The invention as defined in claim 18 wherein the means for filtering further comprises:

w. two mesh filtration disks with a paper filtration disk sandwiched between the two mesh filtration disks and stacked upon a flat upper surface of the straining cap.

21. A container to be used in a juicer comprising:
   a. a pressing end located at
   b. one end of a collapsible body,
   c. a straining end located at an end of the body opposite the pressing end,
   d. a plug extending into the body,
   e. a major axis being a longitudinal centerline of the container,
   f. the body having a body side,
   g. the container having an expanded configuration and a collapsed configuration,
   h. the container defining a large volume within said container's interior when in the expanded configuration,
   j. the container defining a small volume within said container's interior when in the collapsed configuration,
   k. each volume having a length measured along the major axis between the pressing end and straining end,
   l. each volume having a longitudinal centerline coincident with the major axis,
   m. the container tending to the expanded configuration until an outside deforming force is exerted upon said container sufficient to overcome the tendency,
   n. the plug extending into the small cylinder so that a majority of said small volume is occupied by said plug,
   o. a minimum working clearance being between the plug and the body side of the collapsed container,
   p. the straining end being liquid permeable,
   q. the straining end being the only part of the container through which liquid may escape from within the container;
   r. the body being constructed from flexible material that is liquid impermeable,
   s. the body being open through an aperture at the pressing end of said body,
   t. the body being open through another aperture at the straining end of the body,
   u. the body terminating in threaded necks, one each at the pressing end and the straining end,
   v. each neck being threaded by a spiral ridge about an exterior surface of said neck,
   w. the container having a pressing cap connectable to the pressing end of the body,
   x. the container having a straining cap connectable to the straining end of the body,
   y. the straining cap having perforations that serve as passages through said cap,
   z. the straining cap having channels in a channeled lower surface of said straining cap,
   aa. each channel extending from an interior of the channeled lower surface and having a depth sufficient to allow fluid to flow in said channel,
   bb. each channel being open at an exterior edge of the straining cap,
   cc. the pressing cap and the straining cap being constructed from a material sufficiently rigid to maintain the shape of said caps when the deforming force is applied,
   dd. the pressing cap having a flat top end,
   ee. the straining cap having a level bottom end
   ff. the pressing cap and the straining cap being threaded with spiral grooves on a circular interior surface of said caps,
   gg. the grooves on the caps and the ridges on the necks being matable,
   hh. seals being created between the body and the caps thereby closing the necks of said body,
   jj. the plug being constructed from a material sufficiently rigid to maintain said plug's shape under the deforming force,
   kk. means for filtering being located at the straining end of the body, and
   ll. the plug being located at the pressing end of the container.

22. The invention as defined in claim 21 further comprising:
   mm. a lower flat plug surface being positioned proximately with a flat upper surface of the straining cap when the container is in the collapsed configuration, and
   nn. the means for filtering further comprises a mesh filtration disk positioned upon a flat upper surface of a straining cap.

* * * * *